No. 727,585. Patented May 12, 1903.

UNITED STATES PATENT OFFICE.

FRANK BUNYAN, OF STRATFORD, CANADA.

FOOD PRODUCT AND PROCESS OF PREPARING SAME.

SPECIFICATION forming part of Letters Patent No. 727,585, dated May 12, 1903.

Application filed June 19, 1902. Serial No. 112,295. (No specimens.)

*To all whom it may concern:*

Be it known that I, FRANK BUNYAN, residing at Stratford, in the county of Perth and Province of Ontario, Canada, have invented certain new and useful Improvements in Processes of Preparing Potatoes for Use as a Permanent Food Product, of which the following is a full, clear, and exact description, such as will enable others skilled in the art to which it appertains to make and use the same.

This invention relates to a food product and the process for preparing the same; and it consists in the product and process which will be hereinafter disclosed and the novel features thereof specifically pointed out in the claims at the end of this specification.

In carrying out the process a suitable vegetable or starchy tuber, preferably potato, is used, having been first suitably cleaned. The potatoes are softened by the application of heat, so that they are either entirely or partially cooked. This may be done by boiling, steaming, baking, roasting, or in any other desired way. They are then reduced to the consistency of paste, as by grinding or macerating. This paste is then still further reduced by any suitable mechanical process and by the addition of boiling water to a very thin pulp. If desired, at this stage or at another stage a determined quantity of salt for the purpose of seasoning or any other seasoning material may be added to and thoroughly mixed with the potato-pulp. For the purpose of removing any lumps of potato which have not been reduced to pulp or any foreign matter that may have been left in the pulp it may then be passed through a strainer of very fine mesh. The potato-pulp thus prepared is then placed upon plates of metal, preferably highly polished, or other suitable material in such quantities as to form very thin sheets or films of the liquid pulp. It is desirable that these plates should be very clean and smooth in order to impart a glazed appearance to the finished article. The plates carrying the potato-pulp are then passed through a dry kiln or oven heated to such a degree as to quickly remove all moisture by evaporation without burning or baking the pulp. After the evaporation has been completed the potato will be found to be left in filmy sheets dull on the upper side and with a bright or glazed appearance on the under side and of a pure cream-white in color if not burned or baked. These sheets may then in any suitable way be broken up into flakes or pulverized. For convenience in handling and for certain other purposes the pulverized or powdered potato may then be compressed into biscuits, cakes, or blocks, and, further, if desired, these compressed biscuits, cakes, or blocks may be reduced by granulating or shredding. The advantages of the resulting product will be obvious, but they may be briefly summarized. It can be preserved indefinitely, as it is not affected in any way by extremes of temperature or by atmospheric conditions. In the process of preserving it is sufficiently cooked, so that it is not necessary that it should be further cooked before using, but may be utilized as a food without further preparation or by simply adding water. The weight is very largely reduced by the removal of the water, whereby it is rendered compact, convenient for shipping, and portable, providing a condensed food of very high quality. Moreover, it is rendered a more valuable food for certain purposes in that during the manufacture or reduction to pulp form it goes through the elemental stage of digestion.

It will be obvious that the various steps of the process herein set forth may be carried out in a variety of ways. The preliminary softening and the reduction to paste form and to pulp form may be variously accomplished. The spreading out into sheets and removal of the moisture may be carried out in any way which will subject the pulp in the form of thin sheets or films to the action of heat sufficiently to remove the moisture. The further steps would then depend upon the physical form in which it was desired to have the product and as to whether it was to be stored, transported, or otherwise handled. Obviously, also, various steps of the process, as the seasoning, preliminary reduction to paste form, &c., may be dispensed with without destroying the identity of the process or the value of the product.

Having described my invention, what I claim as new, and desire to secure by Letters Patent, is—

1. The herein-described food product consisting of flakes of potato-pulp from which the water has been eliminated and which present a bright or glazed appearance on one surface and a dull appearance on the other.

2. The process of preparing a food product from potato, which consists in softening cleaned potatoes by the application of heat, reducing said softened potatoes to the consistency of a thin pulp with the addition of water, thereupon spreading out such liquid pulp in thin sheets or films, and applying heat to such sheets to remove the water therefrom.

3. The process of preparing a permanent food product from potato which consists in softening cleaned potatoes by the application of heat, reducing said softened potatoes to the consistency of paste, then further to the consistency of a thin pulp with the addition of water, straining such pulp, and thereupon spreading such pulp in very thin films and applying heat thereto to such an extent as to remove the water.

4. The process of preparing a permanent food product from potato, which consists in softening cleaned potatoes by the application of heat, reducing said softened potatoes to the consistency of paste, then further to the consistency of a thin pulp with the addition of water, straining such pulp and thereupon spreading such pulp in very thin films over a highly-polished metallic surface, and applying heat thereto to such an extent as to remove the water.

In testimony whereof I affix my signature in the presence of two witnesses.

FRANK BUNYAN.

Witnesses:
ALEX. ABRAHAM,
A. J. McPHERSON.